(12) United States Patent
Cheong et al.

(10) Patent No.: US 10,798,419 B2
(45) Date of Patent: Oct. 6, 2020

(54) EMBEDDED CODEC CIRCUITRY FOR SUB-BLOCK BASED ENCODING OF QUANTIZED PREDICTION RESIDUAL LEVELS

(71) Applicant: SONY CORPORATION, Tokyo (JP)

(72) Inventors: Hye-Yeon Cheong, San Jose, CA (US); Ali Tabatabai, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/194,719

(22) Filed: Nov. 19, 2018

(65) Prior Publication Data

US 2020/0162758 A1 May 21, 2020

(51) Int. Cl.
*H04N 19/50* (2014.01)
*H04N 19/61* (2014.01)
*H04N 19/64* (2014.01)
*G06T 9/00* (2006.01)

(52) U.S. Cl.
CPC ............ *H04N 19/647* (2014.11); *G06T 9/004* (2013.01); *H04N 19/50* (2014.11); *H04N 19/61* (2014.11)

(58) Field of Classification Search
CPC .............................. H04N 19/50; H04N 19/61
See application file for complete search history.

(56) References Cited

U.S. PATENT DOCUMENTS

| 5,317,397 | A | * | 5/1994 | Odaka | H04N 19/105 |
| | | | | | 348/699 |
| 5,321,725 | A | | 6/1994 | Paik et al. | |
| 5,801,841 | A | * | 9/1998 | Suzuki | H04N 1/41 |
| | | | | | 375/E7.137 |
| 9,036,934 | B2 | | 5/2015 | Kodama | |
| 9,161,040 | B2 | | 10/2015 | Cheong et al. | |
| 9,538,205 | B2 | | 1/2017 | Ikai et al. | |
| 2005/0053155 | A1 | * | 3/2005 | Holcomb | H04N 19/70 |
| | | | | | 375/240.23 |
| 2005/0053295 | A1 | * | 3/2005 | Holcomb | H04N 19/70 |
| | | | | | 382/236 |
| 2012/0121012 | A1 | * | 5/2012 | Shiodera | H04N 19/176 |
| | | | | | 375/240.03 |
| 2013/0202218 | A1 | * | 8/2013 | Kogure | H04N 19/172 |
| | | | | | 382/232 |
| 2014/0036998 | A1 | | 2/2014 | Narroschke et al. | |
| 2015/0201220 | A1 | * | 7/2015 | Cheong | H04N 19/91 |
| | | | | | 375/240.23 |

(Continued)

*Primary Examiner* — Jamie J Atala
*Assistant Examiner* — Michael Robert Cammarata
(74) *Attorney, Agent, or Firm* — Chip Law Group

(57) ABSTRACT

An embedded codec (EBC) circuitry includes encoder circuitry to determine a count of bits required to encode a plurality of quantized prediction residual levels in each sub-block of a plurality of sub-blocks of an image block, for a first coding scheme and a second coding scheme. The encoder circuitry allocates a bit value to a signaling bit for each sub-block of the plurality of sub-blocks, based on the determined count of bits. A value of the signaling bit represents either the first coding scheme or the second coding scheme. The encoder circuitry generates a bit-stream of the image block by selective application of either the first coding scheme or the second coding scheme on each sub-block of the plurality of sub-blocks, based on the value allocated to the signaling bit for each sub-block of the plurality of sub-blocks.

20 Claims, 7 Drawing Sheets

(56) References Cited

U.S. PATENT DOCUMENTS

| | | | |
|---|---|---|---|
| 2015/0341652 A1* | 11/2015 | Sun | H04N 19/124 |
| | | | 382/233 |
| 2017/0163986 A1* | 6/2017 | Jacobson | H04N 19/137 |
| 2018/0234694 A1* | 8/2018 | Sarwer | H04N 19/70 |

* cited by examiner

EMBEDDED CODEC CIRCUITRY FOR SUB-BLOCK BASED ENCODING OF QUANTIZED PREDICTION RESIDUAL LEVELS

CROSS-REFERENCE TO RELATED APPLICATIONS/INCORPORATION BY REFERENCE

None.

FIELD

Various embodiments of the disclosure relate to image and video compression or decompression technologies. More specifically, various embodiments of the disclosure relate to embedded codec circuitry for sub-block based encoding of quantized prediction residual levels.

BACKGROUND

With recent advancements in imaging technologies, there is an increasing demand for on-chip codecs in image capturing and display devices that can handle compression and storage of different images or video in wide variety of image resolutions (e.g., low to high resolution images/video). Currently, an image or a video may be subjected to multiple coding techniques, for example, transform coding, entropy coding, residual prediction, quantization, and the like, to achieve a desired compression. Typically, during entropy coding, a single entropy coding scheme may be used to encode all image sub-blocks within an image block. In certain scenarios, a number range of input values of one image sub-block may be different from the number range of input values of another image sub-block within the image block. In such scenarios, entropy coding the different image sub-blocks with the same entropy coding scheme, may result in compression inefficiency, sub-optimal memory usage, and/or adversely impact quality of encoded image, especially in on-chip codes where it is desirable to achieve an area efficiency with respect to throughput while minimizing an on-chip memory usage.

Further limitations and disadvantages of conventional and traditional approaches will become apparent to one skill in the art, through comparison of described systems with some aspects of the present disclosure, as set forth in the remainder of the present application and with reference to the drawings.

SUMMARY

An embedded codec (EBC) circuitry and a method for sub-block based encoding of quantized prediction residual levels are provided, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in a method and embedded codec (EBC) circuitry for sub-block based encoding of quantized prediction residual levels. The EBC circuitry may include a memory and an encoder circuitry that handles generation of encoded bitstream of an image block (a one-dimensional (1D) image block or a 2D image block). The disclosed EBC circuitry selects a specific coding scheme from different coding schemes for different sub-blocks of the image block based on a comparison of total count of bits required to encode the image block according to different coding schemes. A coding scheme which yields a minimum number of bits may be selected for encoding. Alternatively, In accordance with an embodiment, a threshold range of values of quantized prediction residuals of different sub-blocks may be also specified based on comparison of code word length for different coding schemes. A specific coding scheme is selected at a sub-block level based on whether the maximum number of quantized prediction residuals in a particular sub-block lie within the threshold range. The threshold range defines the range of values of quantized prediction residuals around zero. The differentiation at a sub-block level further renders an opportunity to adaptively reduce an allocation of bits to a sub-block, as within the threshold range, the specific coding scheme that is selected may employ a shorter code word length (number of bits required to encode a residual) as compared to other coding schemes. The sub-block in which the maximum number of quantized prediction residuals lie outside the threshold range, is encoded using another coding scheme which employ shorter code word length as compared to other coding schemes for such input values (i.e., non-zero quantized prediction residuals) outside the threshold range. The selective application of selected coding schemes at the sub-block level reduces the number of bits (per residual value in the sub-block) that are conventionally required to encode the image block. As a result of such selective application of selected coding schemes at the sub-block level, compression efficiency is significantly improved without an adverse impact on quality of encoded image. Further, an area efficiency with respect to throughput of the disclosed EBC circuitry is enhanced and an on-chip memory usage is optimized.

Figure 1:
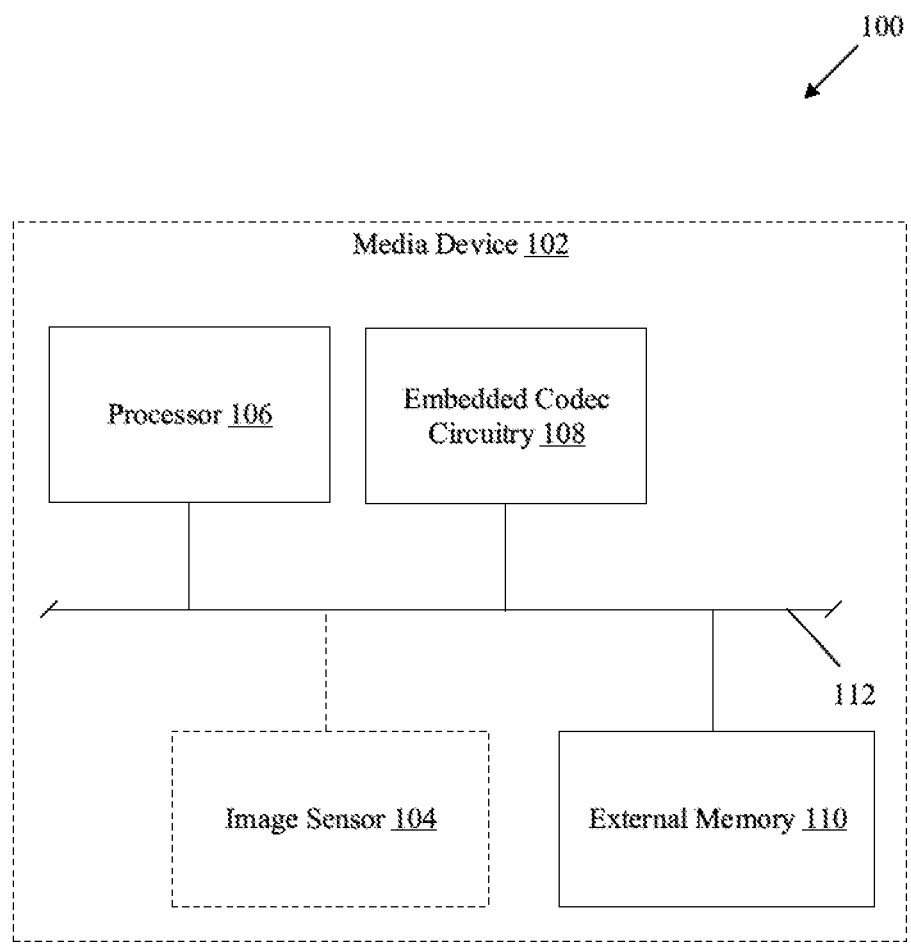
FIG. 1 is a block diagram that illustrates an exemplary media device with an embedded codec (EBC) circuitry and other circuitries for sub-block based encoding, in accordance with an embodiment of the disclosure.

FIG. 1 is a block diagram that illustrates an exemplary media device with an embedded codec (EBC) circuitry and other circuitries for sub-block based entropy coding, in accordance with an embodiment of the disclosure. With reference to FIG. 1, there is shown a media device 102 that includes a processor 106, an embedded codec (EBC) circuitry 108, and an external memory 110. In some embodiments, an image sensor 104 may be communicatively coupled to the processor 106, the EBC circuitry 108, and the external memory 110. There is further shown a system bus 112 that interconnects the image sensor 104, the processor 106, the EBC circuitry 108, and the external memory 110.

The media device 102 may comprise suitable logic, circuitry, and interfaces that may be configured to store uncompressed raw images and/or videos as encoded (i.e. compressed) images and/or videos in the external memory 110. The media device 102 may be further configured to manage encoding as well as decoding of media content (for example, encoded images and/or videos) and further playback of the decoded media content at the media device 102. The media device 102 may include a dedicated on-chip codec (such as the EBC circuitry 108) for an offline (without the need for Internet/network) processing and compression/decompression of images/video. In some embodiments, the media device 102 may also include one or more image sensors (such as the image sensor 104) to capture images in a raw image file format, which is an uncompressed file format. In such cases, the captured image may be encoded by the EBC circuitry 108 of the media device 102. Examples of the media device 102 may include, but are not limited to, a digital camera, a portable communication device (e.g. laptops, smartphones, tablets, phablets, smart watches, smart glasses, etc.), a media server, a workstation, a desktop computer, and augmented reality/Virtual Reality/Mixed Reality (AR/VR/MR) devices.

Although not shown in FIG. 1, the media device 102 may also include a network interface that may be configured to manage sharing of encoded and/or raw uncompressed images and/or videos with other peripheral or peer-connected devices, through a communication network (also not shown). The detailed description of the network interface and the communication network has been omitted from the present disclosure for the sake of brevity.

The image sensor 104 may comprise suitable logic, circuitry, and interfaces that may be configured to capture a raw uncompressed image or a sequence of raw uncompressed images of a scene in a field-of-view (FOV) of the image sensor. The image sensor 104 may be implemented as an active pixel sensor, such as a complementary-metal-oxide semiconductor (CMOS) sensor. In such implementation, the image sensor 104 may be configured to execute progressive scan (line-by-line) of each row or column of pixels (one dimensional (1D) pixel-array or 1D image block) on a sensor core of the CMOS sensor. The progressive scan may be a vertical scan (column wise) or a horizontal scan (row wise). In some embodiments, instead of an active pixel sensor, the image sensor 104 may be implemented as one of a passive pixel sensor (such as a charged coupled device (CCD) sensor, an oversampled binary image sensor, a planar Fourier capture array (PFCA), a back-illuminated (BSI or BI) sensor, and the like. Although not shown, the image sensor 104 may also include a specialized microprocessor (or a microcontroller) that is configured to operate in accordance with image data from the image sensor 104, a graphic processing unit (GPU) to process images stored in a frame buffer, and/or a memory integrated with the image sensor 104.

The processor 106 may comprise suitable logic, circuitry, and interfaces that may be configured to execute a set of instructions stored in a dedicated memory (e.g., the external memory 110 or an on-chip memory in the EBC circuitry 108). The processor 106 may be implemented based on a number of processor technologies known in the art. Examples of the processor 106 may include, but are not limited to, a Graphical Processing Unit (GPU), a co-processor (such as a specialized image co-processor) for a processor, a specialized digital signal processor, a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The EBC circuitry 108 may comprise suitable logic, circuitry, and interfaces that may be configured to encode an image block (e.g., a 1D image block or a 2D image block) as per a specific compression factor and further decode the encoded image block, in response to instructions received at the EBC circuitry 108. In some embodiments, the image block may be part of an input image (i.e. a raw uncompressed image) or a pixel array (row or column) retrieved directly from a read out register of the image sensor 104, following a row-wise or a column-wise scan by the image sensor 104. The EBC circuitry 108 may further manage storage of a bit-stream of encoded image block in the external memory 110 or may manage transfer of the bit-stream of encoded image block to other media devices via dedicated communication networks.

The EBC circuitry 108 may be implemented as a specialized hardware encoder/decoder interfaced with the other computational circuitries of the media device 102. In such implementation, the EBC circuitry 108 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In accordance with another embodiment, the EBC circuitry 108 may be also interfaced with a graphical processing unit (GPU) to parallelize operations of the EBC circuitry 108. In accordance with yet another embodiment, the EBC circuitry 108 may be implemented as a combination of programmable instructions stored in a memory and logical units (or programmable logic units) on a hardware circuitry of the media device 102.

The external memory 110 may comprise suitable logic, circuitry, and interfaces that may be configured to store an input image (uncompressed raw or encoded) or a sequence of input images. The external memory 110 may be further configured to act as an image buffer to store raw uncompressed image block (or 1D image blocks) retrieved directly from the image sensor 104. Additionally, the external memory 110 may store instructions associated with sequential encoding/decoding schemes that may be selectively applied, by the EBC circuitry 108, to generate a bit-stream of encoded image block. In an exemplary embodiment, the external memory 110 may be dynamic random access memory (DRAM) circuits that may be externally interfaced with the EBC circuitry 108. In another exemplary embodiment, the external memory 110 may be static random access memory (SRAM) circuits that may be externally interfaced with the EBC circuitry 108. Further examples of implementation of the external memory 110 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

In some embodiments, the EBC circuitry 108 may also provide support (e.g., a backward compatibility) for different codec standards that may include Advanced Video Codec (AVC)/Media Experts Group (MPEG-4/AVC) or H.264, MPEG-4/HEVC or H.265, and the like. Additionally, the video codec may be supported by other codec libraries that may include FFmpeg, Xvid, DIVx, VP1-9, Windows Media Codec, FFays, and the like.

The system bus 112 may be a hardware bus that may include a set of data channels (or conductive paths) to different components of the media device 102. Alternatively stated, the system bus 112 may interconnect at least data ports, address ports, and control signal ports of different components of the media device 102. For example, the system bus 112 may interconnect the image sensor 104, the processor 106, the EBC circuitry 108, the external memory 110, and other circuitries to each other. The system bus 112 may be configured to facilitate a serial data communication or parallelized data communication between different components on-board the media device 102. Examples of the system bus 112 may include an 8-bit parallel single system bus, a 16-bit parallel single system bus, a 32-bit parallel single system bus, a 64-bit parallel single system bus, a serial data bus, and the like.

In operation, an image block (a 1D image block or a 2D image block) may be received by the external memory 110 of the media device 102. In some embodiments, the 1D image block or the sequence of 1D image blocks may be retrieved directly from a read-out register of an on-chip image sensor (such as the image sensor 104) or a camera device interfaced with the media device 102. In other embodiments, the 1D image block or the sequence of 1D image blocks may be retrieved from an uncompressed raw input image stored in a persistent storage, such as the external memory 110, of the media device 102 or received externally from other media storage devices, such as cameras, data servers, etc. However, the operation of the disclosed EBC circuitry 108 is not limited to the 1D image block. The EBC circuitry 108 may be further configured to receive a 2D image block directly from the read-out register of the on-chip image sensor (such as the image sensor 104) or the camera device interfaced with the media device 102.

The EBC circuitry 108 may be configured to receive the image block from the external memory 110 or directly from the read out register of the image sensor 104. The EBC circuitry 108 may be configured to execute a sequential encoding scheme on the image block to generate a bit-stream of encoded image block. The bit-stream of encoded image block may include header information that may indicate the sequential encoding scheme applied at encoding of the image block, to obtain the bit-stream of encoded image block. In one implementation, the sequential encoding scheme may include a sequential application of quantization, followed by a residual prediction, and a coding scheme selected for each sub-block of a plurality of sub-blocks of the image block. In another implementation, the sequential encoding scheme may include a sequential application of a residual prediction, followed by transform coding, quantization, and a coding scheme selected for each sub-block of a plurality of sub-blocks In a sequential encoding scheme, the EBC circuitry 108 may be configured to partition the image block for example, a "16×1" image block, into the plurality of image sub-blocks. The plurality of image sub-blocks may correspond to a logical partition of the image block into regions that have sharp change in pixel values at edges. For example, a "16×1" image block may be partitioned into eight "2×1" 1D image sub-blocks, where each "2×1" 1D image sub-block may include strong edges, i.e. a larger difference in pixel values at edges of two consecutive "2×1" 1D image sub-blocks.

The EBC circuitry 108 may be further configured to quantize a plurality of input pixel values in each image sub-block to generate a plurality of quantized values. The plurality of sub-blocks of quantized levels for the image block may be stored in a memory, such as the external memory 110 or an on-chip memory (e.g., a dedicated SRAM or an on-chip cache) in the EBC circuitry 108.

The EBC circuitry 108 may be further configured to apply a residual prediction scheme on a plurality of sub-blocks of quantized values, where each sub-block may include a plurality of quantized values. After application of the residual prediction scheme, a plurality of sub-blocks of quantized prediction residual levels may be obtained from a plurality of sub-blocks of quantized values. The plurality of sub-blocks of quantized prediction residual levels for the image block may be stored in a memory, such as the external memory 110 or an on-chip memory (e.g., a dedicated SRAM or an on-chip cache) in the EBC circuitry 108. Examples of the residual prediction scheme may include, but are not limited to, a Differential Pulse Code Modulation (DPCM) scheme, or an Adaptive DPCM (ADPCM) scheme. In DPCM and ADPCM schemes, instead of utilizing each quantized level, a residue is predicted from reference quantization levels.

Figure 3:
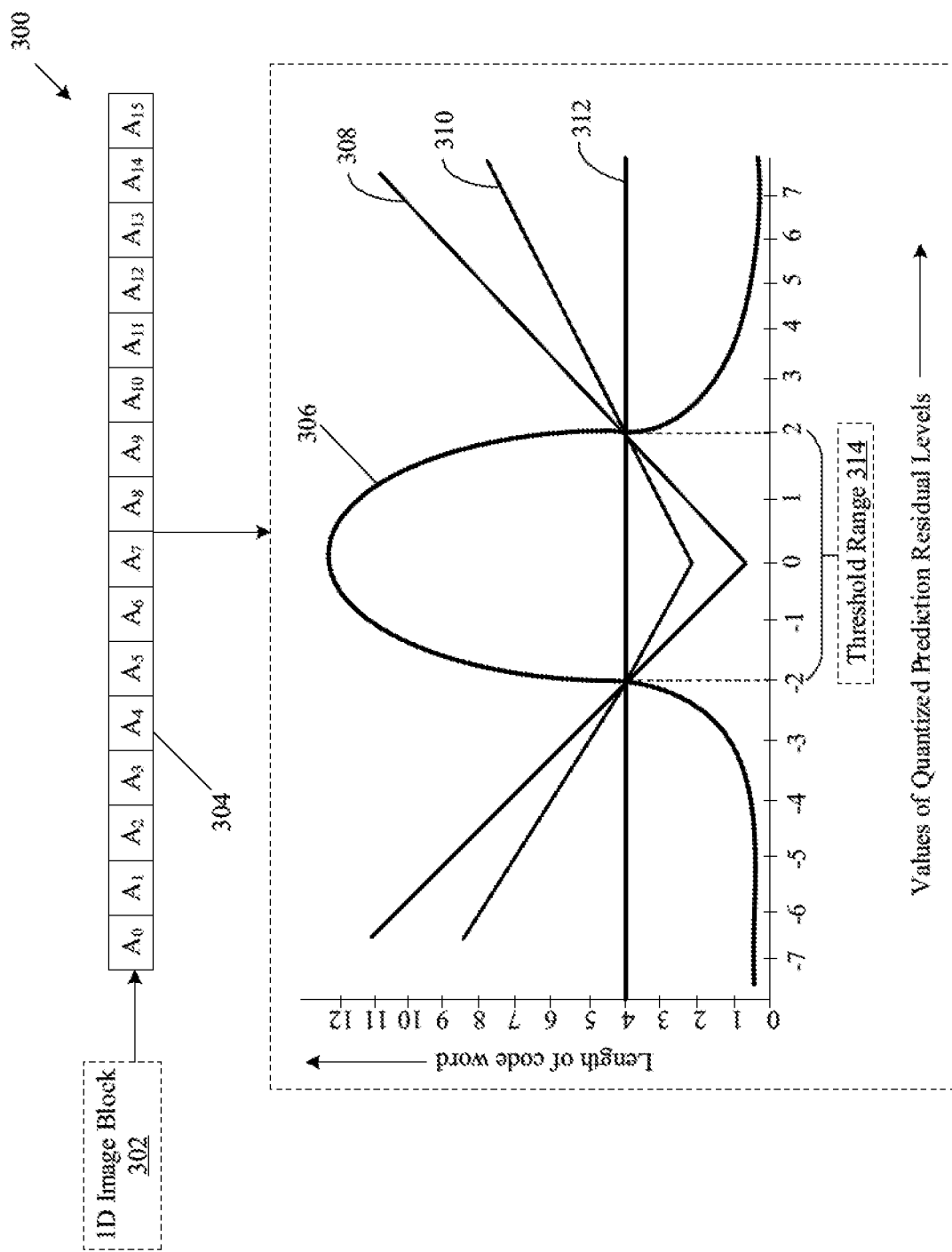
FIG. 3 is a graphical representation that illustrates a distribution of quantized prediction residual levels based on the values of the quantized prediction residual levels, and a comparison of the different coding schemes used by the EBC circuitry of FIG. 2, in accordance with an embodiment of the disclosure.

Each image sub-block, for example, a "2×1" sub-block, may include a plurality of quantized prediction residual levels. It is observed that majority of the total quantized prediction residual levels in the entire image block have value close to zero. A typical distribution of quantized prediction residual levels or transform coefficients of residuals (which serve as an input to entropy encoding) is shown in FIG. 3, in one example. In other words, it is observed that an input to entropy coding in image compression is typically concentrated around 0 (e.g., a Laplace distribution). This distribution may be utilized to decide a threshold range for selection of a suitable coding scheme. For example, the threshold range of [−2, 2] specifies that a majority of prediction residual levels have values between −2 to 2. In accordance with an embodiment, the EBC circuitry 108 may be configured to apply a first coding scheme on a set of sub-blocks, in which the majority of the quantized prediction residual levels have value within the threshold range and a second coding scheme on other sub-blocks, in which the majority of the quantized prediction residual levels have value outside the threshold range. In the threshold range, the first coding scheme yields a code word of shorter length as compared to the second coding scheme. In an implementation, the first coding scheme may be a variable length coding (VLC) and the second coding scheme may be a fixed length coding (FLC). More specifically, the first coding scheme is an entropy coding scheme and the second coding scheme is a pulse code modulation (PCM) scheme.

In order to encode the plurality of sub-blocks of quantized prediction residual levels, the EBC circuitry 108 may be further configured to determine a count of bits required to encode the quantized prediction residual levels in each sub-block, for the first coding scheme and the second coding scheme. The count of bits may also be referred as code word length. The EBC circuitry 108 may be further configured to determine whether the count of bits for the first coding scheme is less than the count of bits for the second coding scheme. Alternatively, the EBC circuitry 108 may be further configured to determine whether a majority of the quantized prediction residual levels within a sub-block lie within the threshold range, which may represent the count of bits for the first coding scheme is less than the count of bits for the second coding scheme. The determination may be defined based on absolute values of quantized prediction residual levels in each sub-block of the plurality of sub-blocks. Thus, the EBC circuitry 108 may be configured to select the first coding scheme or the second coding scheme for a particular sub-block based on whether the majority of the quantized prediction residual levels lie within the threshold range or outside the threshold range respectively.

In an implementation, the first coding scheme is a variable length coding (VLC) scheme in which the code word length depends on the value of the quantized prediction residual level, and the second coding scheme is a fixed length coding (FLC) scheme in which the code word length is fixed for all the values of the quantized prediction residual levels. In other words, in the first coding scheme, the code word length increases with increase in the value of the quantized prediction residual level. Accordingly, for smaller values of the quantized prediction residual levels the first coding scheme (VLC) provides a code word of smaller length as compared to the second coding scheme (FLC). But for the larger values of the quantized prediction residual levels the VLC is inefficient as the number of bits considerably increases as compared to FLC. Therefore, the threshold range is set such that a coding scheme is selected from the VLC or FLC for a particular sub-block of an image block, which yields a minimum number of bits on compression. More specifically, in the threshold range, the number of bits required to encode the quantized prediction residual level using VLC is less than that using FLC, and outside the threshold range, the number of bits required to encode the quantized prediction residual level using FLC is less than that using VLC. Therefore, in order to improve the efficiency in image compression the VLC is selected for the quantized prediction residual levels that are within the threshold range and FLC for the quantized prediction residual levels that are outside the threshold range.

The selection of the first coding scheme or the second coding scheme for each sub-block of the plurality of sub-blocks may be done based on allocation of a signaling bit to the sub-block. Thus, the EBC circuitry 108 may be configured to allocate a signaling bit to each sub-block of the plurality of sub-blocks, in accordance with the determination of the majority of the quantized prediction residuals lie within the threshold range or not. The EBC circuitry 108 may be configured to select suitable entropy coding scheme for different sub-blocks, based on the allocated signaling bit to different sub-blocks. For example, a "0" binary value may be assigned to the signaling bit for the first coding scheme, and a "1" binary value may be assigned to the signaling bit for the second coding scheme. The EBC circuitry 108 may utilize the allocated signaling bit at the encoder stage to select an optimal entropy coding scheme for each sub-block of the plurality of sub-blocks. Similarly, the allocated signaling bit may be utilized at the decoder stage to identify a coding scheme that was used at the encoder stage to entropy code each sub-block of the plurality of sub-blocks of quantized prediction residual levels.

The EBC circuitry 108 may be further configured to generate a bit-stream of encoded image block by application of the coding scheme selectively on the quantized prediction residual levels of each sub-block of the plurality of sub-blocks. The selective application of the entropy coding scheme may be done in accordance with the allocated signaling bit and a specified entropy coding for either "0" or "1" value of the signaling bit. For example, if the allocated signaling has "0" value, then the first coding scheme is applied, and if the allocated signaling has "1" value, then the second coding scheme is applied.

In accordance with another embodiment, an EBC decoder circuit (not shown in FIG. 1) of the EBC circuitry 108 may be configured to pre-store different coding tables (e.g., custom coding tables for Huffman encoding schemes, Exponential-Golomb encoding schemes, or signaling bit tables) and quantization tables. Therefore, the bit-stream of encoded image block need not include different coding tables and quantization tables.

In accordance with an embodiment, the EBC circuitry 108 may be configured to generate the bit-stream of encoded image block such that the bit-stream may be decodable by different external decoders that may utilize different decoding schemes to decode the bit-stream of encoded image block. In such a case, the EBC circuitry 108 may be configured to add different coding tables (e.g., custom coding tables for Huffman encoding schemes, Exponential-Golomb encoding schemes, or signaling bit tables) and quantization tables, in header information or a different meta-stream associated with the bit-stream of encoded image block. By addition of such custom tables and quantization tables in the bit-stream, the output of the EBC circuitry 108 may be decodable by other decoder circuitries.

In accordance with an embodiment, the bit-stream of encoded image block may be stored as part of an input image (such as a 2D image) in the memory, such as the external memory 110 or an on-chip memory in the EBC circuitry 108. In one implementation, the processor 106 may be configured to transfer the bit-stream of encoded image block, via the system bus 112, to a frame buffer (or a frame store) of a display circuitry (e.g., a video card) communicatively interfaced with the system bus 112 of the media device 102. The frame buffer may act as a compressed frame buffer for the display circuitry. The display circuitry (not shown in FIG. 1) may decode and further utilize the bit-stream of encoded bit-stream of image block to display a patch of image at the media device 102. In another implementation, the processor 106 may be configured to transfer the bit-stream of encoded image block, via the system bus 112, to a decoder buffer, such as a decoder picture buffer (DPB) of a video decoder, a buffer memory for an image decoder, or a coded picture buffer (CPB) of a video codec, in the media device 102.

In an exemplary implementation, the media device 102 may be a camera, such as a digital video camera or a digital image camera, and the bit-stream of encoded image block may correspond to an array of pixel values that are directly received from a read-out register of a CMOS sensor in the camera. In a specific scenario, the EBC circuitry 108 may be implemented in the CMOS sensor circuitry.

Figure 2:
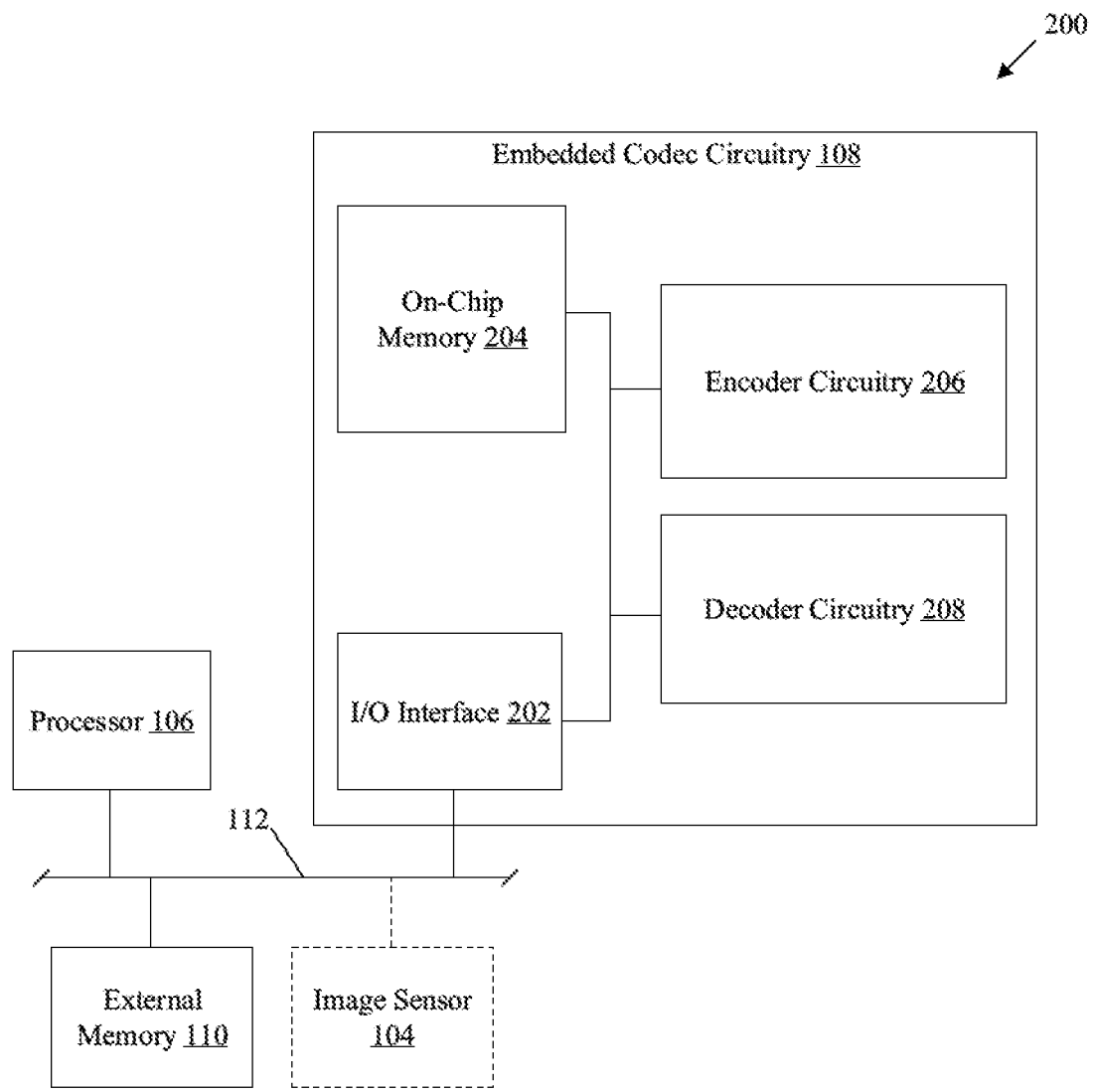
FIG. 2 is a block diagram that illustrates the EBC circuitry of FIG. 1 with various peripheral components for sub-block based entropy coding of quantized prediction residual levels, in accordance with an embodiment of the disclosure.

FIG. 2 is a block diagram that illustrates an embedded codec (EBC) circuitry with various peripheral components for sub-block based entropy coding of quantized prediction residual levels, in accordance with an embodiment of the disclosure. FIG. 2 is explained in conjunction with elements from FIG. 1. With reference to FIG. 2, there is shown a block diagram 200 of the EBC circuitry 108. The EBC circuitry 108 may include an Input/output (I/O) interface 202, an on-chip memory 204, an encoder circuitry 206, and a decoder circuitry 208. In the block diagram 200, there is also shown the image sensor 104, the processor 106, and the external memory 110 communicatively coupled to the EBC circuitry 108, via the system bus 112. In some embodiments, the processor 106 and the external memory 110 may be implemented inside the EBC circuitry 108, without a deviation from the scope of the disclosure.

The I/O interface 202 may comprise suitable logic, circuitry, and interfaces that may be configured to manage a plurality of I/O ports to facilitate exchange of communication data from other peripheral circuitries, via the system bus 112, for example, the external memory 110, the processor 106, or the image sensor 104. The communication data may include a bit-stream of the encoded image block, control signals, CPU instructions, and the like. The configuration of the I/O ports may depend on a specification of the EBC circuitry 108, for example, physical I/O pins in an ASIC, FPGA or a SoC chip.

The on-chip memory 204 may comprise suitable logic, circuitry, and interfaces that may be configured to store different operational data (e.g., transform domain data, residual levels, quantization levels, entropy coded bits, etc.) that may be utilized by different components of the EBC circuitry 108 to encode the image block. Examples of the operational data stored in the on-chip memory 204 may include, but are not limited to, a bit-stream of encoded image block, transform-domain data, quantized levels, quantized-transformed levels, quantized prediction residual levels, computed variables, and temporary processing data, and 1D/2D image blocks. The on-chip memory 204 may be implemented as a specific memory designed with a defined memory specification, such as a read/write speed, a memory size, fabrication factors, and the like. Examples of the on-chip memory 204 may include, but are not limited to, static random access memory (SRAM), dynamic access memory (DRAM), and Static Dynamic RAM (SD-RAM).

The encoder circuitry 206 may comprise suitable logic, circuitry, and interfaces that may be configured to generate a bit-stream of encoded image block by application of a sequential encoding scheme on an image block (a 1D image block or a 2D image block), stored in a memory, such as the on-chip memory 204 or the external memory 110. The encoder circuitry 206 may also select an optimal coding scheme for different sub-blocks (of quantized prediction residual levels) and selectively apply different coding schemes on different sub-blocks. The encoder circuitry 206 may be optimized to reduce the number of bits that are used to encode a quantized prediction residual in each sub-block. Such reduction in the number of bits enhances a compaction efficiency or a compression factor of the inputted image block. In some embodiments, the encoder circuitry 206 may be a hardware encoder chip that may be implemented based on one of ASIC, programmable logic devices (PLDs), SOC, FPGA, digital signal processors (DSPs) or other specialized circuitries. In other embodiments, the encoder circuitry 206 may be implemented as a combination of hardware and stored set of instructions in the on-chip memory 204 (for example, instructions based on VHDL or HDL logic).

The decoder circuitry 208 may comprise suitable logic, circuitry, and interfaces that may be configured to decode a bit-stream of encoded image block based on header information that includes a set of signaling bits allocated to the plurality of sub-blocks (associated with an encoded image block). The decoder circuitry 208 may be further configured to check an enable bit and an all-zero signaling bit included in the bit-stream. In some embodiments, the decoder circuitry 208 may have pre-stored quantization tables and coding tables that may act as a reference for the decoder circuitry 208 to decode the bit-stream of encoded image block. In some embodiments, the decoder circuitry 208 may be a hardware encoder chip that may be implemented based on one of ASIC, programmable logic devices (PLDs), SOC, FPGA, digital signal processors (DSPs) or other specialized circuitries. In other embodiments, the decoder circuitry 208 may be implemented as a combination of hardware and stored set of instructions in the on-chip memory 204 (for example, instructions based on VHDL or HDL logic).

In operation, a plurality of sub-blocks of quantized prediction residual levels of an image block may be stored in the memory, such as the external memory 110 or the on-chip memory 204. Prior to storage, the plurality of sub-blocks of quantized prediction residual levels may be generated based on a sequential application of quantization, followed by a residual prediction on a plurality of image sub-blocks of the image block. For example, in a "16×1" image block, there may be eight "2×1" image sub-blocks. The encoder circuitry 206 may be configured to generate eight "2×1" sub-blocks of quantized prediction residual levels, based on a sequential application of a bit-plane quantization, and DPCM in each "2×1" sub-block of eight "2×1" sub-blocks.

In order to encode the plurality of sub-blocks of quantized prediction residual levels, the encoder circuitry 206 may be configured to retrieve the stored plurality of sub-blocks of quantized prediction residual levels from the memory, such as the external memory 110 or the on-chip memory 204. Each sub-block may include a plurality of quantized prediction residual levels.

The encoder circuitry 206 may be configured to determine a count of bits required to encode the quantized prediction residual levels in each sub-block, for a first coding scheme and a second coding scheme. The encoder circuitry 206 may be further configured to determine whether the count of bits for the first coding scheme is less than the count of bits for the second coding scheme. Alternatively stated, the encoder circuitry 206 may be further configured to determine whether majority of the quantized prediction residual levels lie within a threshold range, which may represent the count of bits for the first coding scheme is less than the count of bits for the second coding scheme. The encoder circuitry 206 may be further configured to select an optimal coding scheme for each sub-block of the plurality of sub-blocks of quantized prediction residual levels of an image block, in accordance with a value of the quantized prediction residual level that lie within the threshold range. The optimal coding scheme may include a first coding scheme or a second coding scheme. More specifically, the first coding scheme is, but not limited to, a variable length coding scheme (or any entropy coding scheme), and the second coding scheme is, but not limited to, a fixed length coding scheme (PCM coding scheme).

In order to identify a coding scheme for a corresponding sub-block at a time of encoding or decoding a sub-block, the encoder circuitry 206 may be configured to allocate a set of signaling bits for the plurality of sub-blocks. The set of signaling bits may be allocated based on a majority of quantized prediction residual levels in each sub-block of the plurality of sub-blocks, where the majority of quantized prediction residual levels lie within the threshold range. The allocated set of signaling bits may represent a coding scheme for each sub-block of the plurality of sub-blocks.

Binary "0" value represents the first coding scheme and binary value "1" represents the second coding scheme.

As an example, an 16×1 image block may have eight 2×1 image sub-blocks, shown by Table 1 as follows:

TABLE 1

| 16×1 Image Block | | | | | | | | | | | | | | | |
|---|---|---|---|---|---|---|---|---|---|---|---|---|---|---|---|
| $P_n$ | 0 | 1 | 3 | 4 | −1 | 0 | 0 | 0 | 3 | 3 | 4 | 3 | −3 | 5 | 2 | 1 |
| n | 0 | 1 | 2 | 3 | 4 | 5 | 6 | 7 | 8 | 9 | 10 | 11 | 12 | 13 | 14 | 15 | where "$P_n$" represents a value of quantized prediction residual level at a position "n" in the "16×1" image block.

Referring to Table 1, as shown above, the threshold range may be set as [−2, 2]. The threshold range may be set based on the observation that within the threshold range of −2 to 2, the first coding scheme (entropy coding) is efficient (in terms of number of bits required to encode a quantized prediction residual), whereas outside the threshold range, the second coding scheme (PCM coding) is efficient instead of the first coding scheme. In other words, the comparison of the count of bits for the first coding scheme and the second coding scheme may result into the threshold range, as the count of bits for the first coding scheme may be less than that of the second coding scheme within the threshold range. As the first sub-block contains 0 and 1 that are within −2 and 2, the signaling bit for the first sub-block may be set as binary "0". The second sub-block may include input values "3" and "4" that are outside the threshold range of "−2 to 2". Accordingly, the signaling bit for the second sub-block may be set as binary "1". Similarly, the signaling bits for the remaining sub-blocks may also be set either to a binary "0" or binary value "1" and a set of signaling bits for each sub-block may be generated, as shown, for example, in Table 2 below:

TABLE 2

| Set of signaling bits | | | | | | | | |
|---|---|---|---|---|---|---|---|---|
| n | 1 | 2 | 3 | 4 | 5 | 6 | 7 | 8 |
| $S_B$ | 0 | 1 | 0 | 0 | 1 | 1 | 1 | 0 | where "$S_B$" represents a signaling bit for the $n^{th}$ sub-block in the "16×1" image block.

In accordance with an embodiment, the encoder circuitry 206 may be configured to determine whether the majority of the quantized prediction residual levels in each sub-block of the plurality of sub-blocks lies within the threshold range or not. The encoder circuitry 206 may be further configured to allocate the signaling bits in accordance with the determination.

The encoder circuitry 206 may be configured to select the first coding scheme or the second coding scheme, for each sub-block of the plurality of sub-blocks. The first coding scheme may include, but is not limited to, an entropy coding scheme such as a Huffman coding scheme, an exponential Golomb coding scheme, a progressive Golomb coding scheme, a Golomb-Rice coding scheme, and a combination of the Huffman coding scheme and the exponential Golomb coding scheme. The second coding scheme may include, but is not limited to, PCM coding scheme or any fixed length coding scheme.

The selection of the entropy coding scheme from the set of entropy coding schemes may be done based on the allocated signaling bit for each sub-block. The allocated signaling bit may be used as a decision factor to select a suitable coding scheme that may reduce the number of bits required to encode a corresponding sub-block. In accordance with an embodiment, a sub-block, in which the majority of the quantized prediction residual levels lie within a defined threshold range, is entropy coded with the application of the first coding scheme. The allocated signaling bit is set as "0" in the set of signaling bits, for the corresponding sub-block.

For example, for a "4×1" sub-block (B), represented by $B_1$=[−1 0 2 0], the quantized prediction residual levels lies within the threshold range [−2, 2]. Thus, the signaling bit for $B_1$ may be set as "0" and an Exponential Golomb encoding scheme may be selected as the first coding scheme (entropy coding scheme). Thus, the quantized prediction residual level "−1" may be encoded as "010", "0" as "1", and "2" as "00100". In this case, a total number of bits ($N_B$) to encode the "4×1" sub-block ($B_1$) may be computed by equation (1) as follows:

$$N_B = S_B + \Sigma B i \qquad (1)$$

where "$S_B$" represents the number of signaling bits and "$B_i$" represents a number of bits used to entropy code the $i^{th}$ quantized prediction residual level. For a "4×1" sub-block ($B_1$), "$S_B$" may be "1", "$B_i$" may be "3", "1", "5", and "1". Thus, the total number of bits ($N_B$) may be "11", i.e. a sum of "$S_B$" and "$B_i$".

In accordance with an embodiment, a sub-block, in which the majority of the quantized prediction residual levels lie outside the defined threshold range, may be PCM coded (i.e., the application of the second coding scheme). The allocated signaling bit is set as "1" in the set of signaling bits, for the corresponding sub-block.

In another example, for a "4×1" sub-block ($B_2$), represented by $B_2$=[3 4 7 0], the majority of the quantized prediction residual levels lie outside the threshold range [−2, 2]. Thus, the signaling bit for $B_1$ may be set as "1" and a PCM coding scheme may be selected as the second coding scheme (fixed length coding scheme). Here, the PCM coding scheme may not be applied on the quantized prediction residual levels. The PCM coding scheme may only applied to the quantized values that are stored prior to the residual prediction. As PCM coding scheme may be applied on the stored quantized values of the 1D sub-block, the number of bits for each quantized value is fixed (may be "3"). In this case, the total number of bits ($N_B$) to entropy code "$B_2$" may be also computed by the equation (1). For "$B_2$", "$S_B$" may be "1", "$B_i$" may be "3" for all the quantized values. Thus, the total number of bits ($N_B$) may be "13", i.e. a sum of "$S_B$" and "$B_i$".

The encoder circuitry 206 may be further configured to allocate an enable bit for the entire image block, based on whether a single coding scheme is selected for all sub-blocks in the image block. The enable bit may be a signaling bit that indicates whether a single coding scheme or different coding scheme is selected for all sub-blocks in the image block. More specifically, the enable bit is set as "1" to indicate that the image block is encoded with a combination of the first coding scheme and the second coding scheme, and as "0" to indicate that the entire image block is encoded using a single coding scheme. In other words, in a case where all sub-blocks of the image block are entropy coded (first coding scheme), the enable bit is set as "0". In another scenario, if some sub-blocks are entropy coded and some are PCM coded, then the enable bit is set as "1".

In accordance with an embodiment, the encoder circuitry 206 may be further configured to determine whether the first coding scheme is selected for all the sub-blocks in the image block or not, and set the enable bit based on the determination. The encoder circuitry 206 may be further configured to generate a bit-stream of the encoded image block by application of the coding scheme selectively on the quantized prediction residual levels of each sub-block of the plurality of sub-blocks. Such selectivity may ensure that an optimal number of bits (i.e. a reduction in bits per pixel (bpp) for encoded sub-block) can be saved and is done on a sub-block level, where a value of the quantized prediction residual level may be considered for encoding each sub-block. The total number of bits in the bit-stream of encoded image block may also include the enable bit and a number of the allocated set of signaling bits for the plurality of sub-blocks, in addition to the encoded bits for the quantized prediction residual levels.

In accordance with an embodiment, the encoder circuitry 206 may be further configured to determine whether all the quantized prediction residual levels in the sub-blocks for which the first coding scheme is selected, are zero or not. The encoder circuitry 206 may be further configured to set an all-zero signaling bit in header information of the generated bit-stream, based on the determination.

In a scenario, when all of the quantized prediction residual levels are found to be zero, the encoder circuitry 206 may be further configured to set the all-zero signaling bit as "1", and skip the application of the first coding scheme. In other words, the sub-blocks are not entropy coded if all the quantized prediction residual levels are zero in those sub-blocks, and only the remaining sub-blocks are PCM coded.

In accordance with an embodiment, the image block may correspond to a chroma block having a color model. The color model may include, but is not limited to, a RGB model and a YUV model. In a scenario in which the color model is a RGB model, the image block may include a plurality of color-blocks that correspond to "R" component, "G" component, and "B" component. The encoder circuitry 206 may be further configured to allocate either the first bit value or the second bit value to the signaling bit for any one of the plurality of color-blocks. In other words, the sub-block based coding scheme is applied on one of the color block, and remaining color blocks may be encoded using a single coding scheme. In an exemplary embodiment, the sub-block based coding scheme may be applied on all the color blocks of the image block. In another exemplary embodiment, the encoder circuitry 206 may be further configured to select from a first variable length coding scheme or a second variable length coding scheme for a particular color block, and from a fixed length coding scheme or the first variable length coding scheme for another color block. For example, in YUV color model, the Y color block may be encoded using the PCM coding scheme and an entropy coding scheme, and the UV block may be encoded using two entropy coding schemes.

In conventional entropy coding techniques, the quantized prediction residual levels are encoded using a same coding scheme for all sub-blocks of an image block, without an allocation of a set of signaling bits to indicate the coding scheme. For example, if "$B_1$" and "$B_2$" both are entropy coded using the Exponential Golomb coding scheme, then the number of bits required would be "10 bits" for "$B_1$" sub-block and "18 bits" for "$B_2$" sub-block. Therefore, the total number of bits ($N_B$) would have been "28 bits" in case signaling bit and sub-block level coding is not employed. In contrast, the total number of bits ($N_B$) is "11+13=24 bits" based on the disclosed method of application of coding scheme on a "8×1" 1D image block that has "$B_1$" and "$B_2$" as sub-blocks. Thus, "28−24=4 bits" are saved by the application of the disclosed method. This provides a significant improvement in the compression efficiency if the image block size is large.

The total number of bits required to encode an image block may reduce over time based on a number of sub-blocks for which the second coding scheme is selected. As a result, an image block, that has more number of sub-blocks lying which are encoded using the second coding scheme, can be encoded as per an increased compression ratio, a reduced bits per pixel (bpp) value associated with substantial bit savings, with respect to conventional techniques. The reduction in number of bits at sub-block level may be a substantial reduction for a high resolution input image, for example, higher definition (HD) image/video.

FIG. 3 is a graphical representation that illustrates a distribution of quantized prediction residual levels based on the values of the quantized prediction residual levels, and a comparison of the different coding schemes used by the EBC circuitry of FIG. 2, in accordance with an embodiment of the disclosure. FIG. 3 is explained in conjunction with elements from FIG. 1 and FIG. 2. With reference to FIG. 3, there is shown a graph 300. The graph 300 may describe a typical distribution of the quantized prediction residual levels and a variation of length of a code word with a value of the quantized prediction residual level for different coding schemes. As shown, there is a 1D image block 302 that includes a plurality of quantized prediction residual levels 304 after the sequential application of quantization and residual prediction scheme on the 1D image block 302. There are also shown a set of curves, such as a distribution curve 306, a curve 308 for a first variable length coding scheme, a curve 310 for a second variable length coding scheme, and a line 312 for the fixed length coding scheme.

The distribution curve 306 shows a distribution of the plurality of quantized prediction residual levels 304 with respect to the values of the plurality of quantized prediction residual levels 304. As shown in FIG. 3, in an example, the majority of the plurality of quantized prediction residual levels 304 have values near to zero. In other words, the majority of the plurality of quantized prediction residual levels 304 have values between a threshold range 314 (−2 to 2). The distribution curve 306 further shows that the quantized prediction residual levels of the plurality of quantized prediction residual levels 304 which have higher values are less in number.

The curve 308 and the curve 310 shows a variation in the length of the code word for a first variable length coding scheme and a second variable length coding scheme, respectively, with respect to the values of the plurality of quantized prediction residual levels 304. As shown in FIG. 3, in an example, the length of the code word for both the first and the second variable length coding schemes (represented by the curves 308 and 310), increases with the increase in magnitude of the values of the plurality of quantized prediction residual levels 304. In the FIG. 3, the values of quantized prediction residual levels that are within the threshold range 314, the code word length for the first variable length coding scheme (represented by the curve 308) is less than that for the second variable length coding scheme (represented by the curve 310), i.e. the curve 308 is below the curve 310. Also, for the values of quantized prediction residual levels that are outside the threshold range 314, the code word length for the second variable length coding scheme (represented by the curve 310) is less than that for the first variable length coding scheme (represented by curve 308), i.e. the curve 310 is below the curve 308.

The line 312 shows approximately equal or equal length of the code word for a fixed length coding scheme with respect to the values of the plurality of quantized prediction residual levels 304. The length of the code word for the fixed length coding scheme is constant (i.e., same length) for all the values of the plurality of quantized prediction residual levels 304. In FIG. 3, the values of quantized prediction residual levels that are within the threshold range 314, the code word length for the first and the second variable length coding schemes is less than that for the fixed length coding scheme, i.e. the curves 308 and 310 are below the line 312. Also, for the values of quantized prediction residual levels that are outside the threshold range 314, the code word length for the fixed length coding scheme is less than that for the first and the second variable length coding schemes, i.e. the line 312 is below the curves 308 and 310.

From FIG. 3, it can readily be understood that for the values of quantized prediction residual levels that are within the threshold range 314, the first variable length coding scheme is optimum as the code word length is minimum for it. And, for the values of quantized prediction residual levels that are outside the threshold range 314, the fixed length coding scheme is optimum. The threshold range 314 may be defined based on points of intersection of the curves 308, 310, and 312. More specifically, extreme points of the threshold range 314 may correspond to the points of intersection. In other words, the threshold range 314 may define values of quantized prediction residual levels, beyond which the code word length for the fixed length coding scheme may employ a code word of shorter length as compared to the first and the second variable length coding schemes.

Figure 4A:
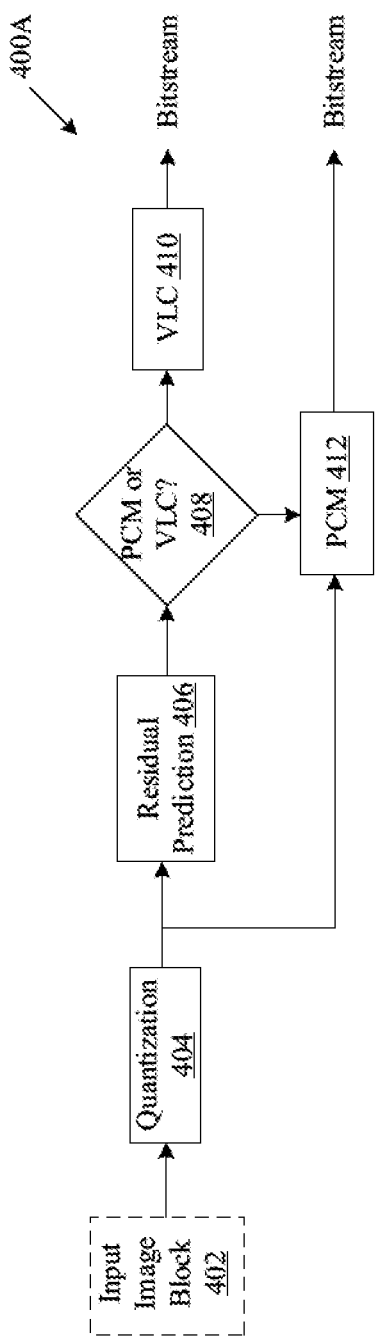
FIGS. 4A and 4B illustrate two different sequential encoding schemes used by the EBC circuitry of FIG. 2, in accordance with an embodiment of the disclosure.
Figure 4B:
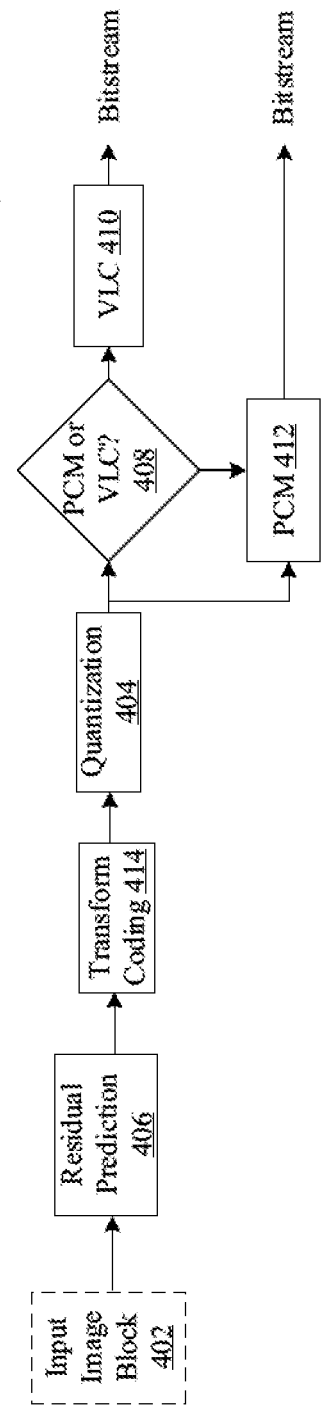

FIGS. 4A and 4B are block diagrams that illustrate two different sequential encoding schemes applied by the EBC circuitry of FIG. 2, in accordance with an embodiment of the disclosure. FIGS. 4A and 4B are explained in conjunction with elements from FIGS. 1, 2, and 3. With reference to FIG. 4A, there is shown a block diagram 400A that depicts a first sequential encoding applied on an input image block 402. Although not shown in FIG. 4A or 4B, the input image block 402 may be partitioned into a plurality of sub-blocks that includes a plurality of input pixel values in each sub-block. It should be noted that other sequential encoding schemes can also be applied on the input image block 402, without a deviation from the scope of the disclosure.

Referring to FIG. 4A, according to block diagram 400A, the input image block may be subjected to quantization 404 in which the plurality of input pixel values may be quantized to generate a plurality of quantized values in each sub-block of the plurality of sub-blocks. Thereafter, the plurality of quantized values may be stored on the on-chip memory 204 (or in the external memory 110) for further processing. After the quantization 404, the plurality of quantized values may be subjected to residual prediction 406 in which the plurality of quantized values may be processed to generate a plurality of quantized prediction residual levels in each sub-block of the plurality of sub-blocks. The residual prediction 406 may include, but not limited to, a differential pulse code modulation (DPCM) scheme. After the residual prediction 406, it may be determined whether a PCM or a VLC is to be selected for each sub-block. The selection may be based on the values of the plurality of quantized prediction residual levels in each sub-block of the plurality of sub-blocks. Alternatively stated, the count of bits required to encode the plurality of quantized prediction residual levels in accordance with the PCM and the VLC may be compared. In cases where the count of bits for the VLC is determined to be less than the count of bits for the PCM, then the VLC 410 is applied for that sub-block. Otherwise, the PCM 412 is applied for that sub-block.

In the VLC 410, the plurality of quantized prediction residual levels in a sub-block are encoded to generate a code word of variable length, that forms a part of a bit-stream of encoded input image block 402. The VLC 410 may include an entropy coding scheme, but not limited to, a Huffman coding scheme, an exponential Golomb coding scheme, a progressive Golomb coding scheme, a Golomb-Rice coding scheme, and a combination of the Huffman coding scheme and the exponential Golomb coding scheme.

In the PCM 412, the PCM coding scheme is applied on the plurality of quantized values in a sub-block. The plurality of quantized values are retrieved form the external memory 110 or the on-chip memory 204 and encoded to generate a code word of fixed length that forms a part of the bit-stream of encoded input image block 402. It should be noted that the PCM 412 can be replaced by any other fixed length coding scheme or a variable length coding scheme.

Referring to FIG. 4B, according to block diagram 400B, the input image block 402 may be subjected to residual prediction 406 initially in which the plurality of input pixel values may be processed to generate a plurality of residual prediction levels in each sub-block of the plurality of sub-blocks. After the residual prediction 406, the plurality of residual prediction levels may be subjected to transform coding 414 in which the plurality of residual prediction levels may be encoded to generate a plurality of transform coefficients in each sub-block of the plurality of sub-blocks. The transform coding 414 may include, but are not limited to, type I-VIII Discrete Cosine Transform (DCT), type I-VIII Discrete Sine Transform (DST), Discrete Wavelet Transform (DWT), and a Dual-Tree Complex Wavelet Transform (DCWT). After the transform coding 414, the plurality of transform coefficients are subjected to the quantization 404 in which the plurality of transform coefficients are encoded to generate a plurality of quantized-transformed prediction residual levels in each sub-block of the plurality of sub-blocks. At 408, it may be determined whether VLC or FLC is to be selected for each sub-block of the plurality of sub-blocks. Alternatively stated, the count of bits required to encode the plurality of quantized prediction residual levels in accordance with the PCM and the VLC may be compared. In cases where the count of bits for the VLC is determined to be less than the count of bits for the PCM, then the VLC 410 is selected for that sub-block. Otherwise, the PCM 412 is selected for that sub-block.

As shown in FIG. 4B, the selected coding scheme is applied on the plurality of quantized-transformed prediction residual levels to generate a bit-stream of encoded input image block 402. It should be noted that the codec architecture that defines the sequential application of the quantization 404, the residual prediction 406, and transform coding 414 is not limited to the block diagrams 400A and 400B, it can also have other variations that will give a sequential encoding scheme different from the first and the second sequential encoding schemes.

Figure 5:
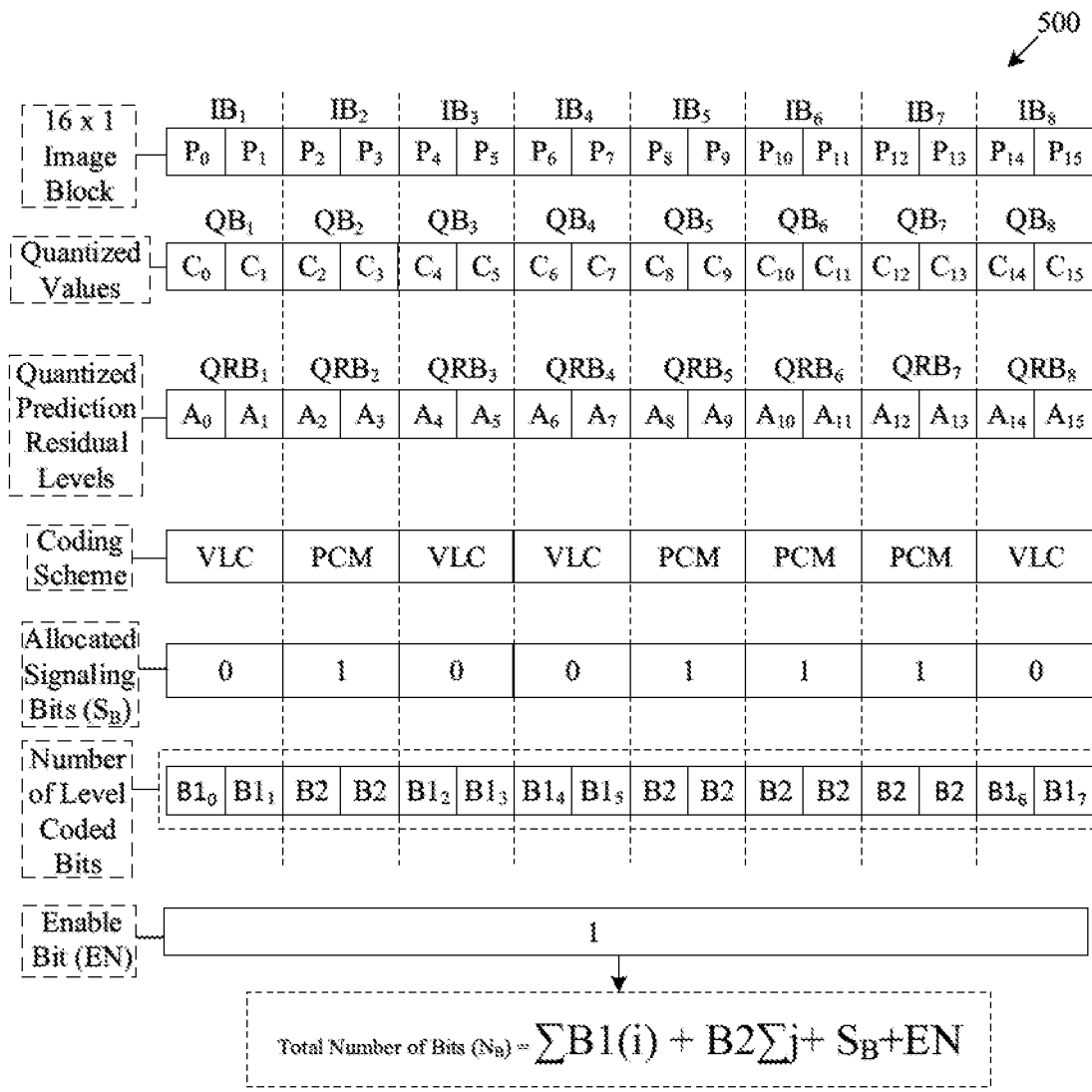
FIG. 5 illustrates application of an exemplary sequential encoding scheme on a 1D image block by the EBC circuitry of FIG. 2, for sub-block based encoding of quantized prediction residual levels, in accordance with an embodiment of the disclosure.

FIG. 5 is a diagram that illustrates application of a schematic encoding scheme on a 1D image block by the EBC circuitry of FIG. 2, in accordance with an embodiment of the disclosure. FIG. 5 is explained in conjunction with elements from FIGS. 1, 2, 3, 4A and 4B. With reference to FIG. 5, there is shown a diagram 500 that shows outputs at different stages of the encoder circuitry 206 while applying the first sequential encoding scheme on a 16×1 image block, according to the block diagram 400A.

In operation, the encoder circuitry 206 may be configured to retrieve a 16×1 image block that may be partitioned into eight 1D sub-blocks. For example, the first sub-block $IB_1$ may include two pixel values $P_0$, $P_1$ in an example. Similarly, $IB_2=[P_2, P_3]$, $IB_3=[P_4, P_5]$, $IB_4=[P_6, P_7]$, $IB_5=[P_8, P_9]$, $IB_6=[P_{19}, P_{11}]$, $IB_7=[P_{12}, P_{13}]$, and $IB_8=[P_{14}, P_{15}]$. The encoder circuitry 206 may be configured to apply the quantization 404 on each of $IB_1, IB_2, IB_3, \ldots, IB_8$ to obtain "8" quantized sub-blocks, i.e. $QB_1=[C_0, C_1,]$, $QB_2=[C_2, C_3]$, $QB_3=[C_4, C_5]$, $QB_4=[C_6, C_7]$, $QB_5=[C_8, C_9]$, $QB_6=[C_{10}, C_{11}]$, $QB_7=[C_{12}, C_{13}]$, and $QB_8=[C_{14}, C_{15}]$.

The encoder circuitry 206 may be configured to apply the residual prediction 406, such as DPCM, on each of $QB_1$, $QB_2$, $QB_3$, $QB_4$, $QB_5$, $QB_6$, $QB_7$, and $QB_8$, to obtain eight sub-blocks of quantized prediction residual levels, i.e. $QRB_1=[A_0, A_1]$, $QRB_2=[A_2, A_3]$, $QRB_3=[A_4, A_5]$, $QRB_4=[A_6, A_7]$, $QRB_5=[As, A_9]$, $QRB_6=[A_{10}, A_{11}]$, $QRB_7=[A_{12}, A_{13}]$, and $QRB_8=[A_{14}, A_{15}]$. Thereafter, the encoder circuitry 206 may be configured to select either the VLC 410 or the PCM 412 for each of the $QRB_1$, $QRB_2$, $QRB_3$, $QRB_4$, $QRB_5$, $QRB_6$, $QRB_7$, and $QRB_8$, based on the values of $A_i$ (i=0 to 15). More specifically, if the value of $A_0$ and $A_1$ in $QRB_1$ lie within a threshold range (for example, −2 to 2), then the VLC 410 is selected, and a signaling bit corresponding to $QRB_1$ is set to binary "0" value. Now, the sub-blocks $QRB_1$, $QRB_3$, $QRB_4$, and $QRB_8$ may have values $A_0$, $A_1$, $A_4$, As, $A_6$, $A_7$, $A_{14}$, and $A_{15}$ that lie within the threshold range and therefore, a signaling bit for each of the $QRB_1$, $QRB_3$, $QRB_4$, and $QRB_8$ is set as "0" (in a number of allocated signaling bits ($S_B$)). Similarly, the sub-blocks $QRB_2$, $QRB_5$, $QRB_6$, and $QRB_7$ may have values $A_2$, $A_3$, $A_8$, $A_9$, $A_{10}$, $A_{11}$, $A_{12}$, and $A_{13}$ that lie outside the threshold range and therefore, a signaling bit for each of the $QRB_2$, $QRB_5$, $QRB_6$, and $QRB_7$ is set as "1" (in the number of allocated signaling bits ($S_B$)). The binary value "0" may be a signaling bit used to represent the VLC coding scheme and the binary value "1" may be another signaling bit used to represent the PCM coding scheme.

The encoder circuitry 206 may be further configured to set an enable bit (EN) to binary value "1" that indicates a first mode of the encoder circuitry 206 in which both the VLC and the PCM coding schemes are used to encode the 16×1 image block. If the EN bit is "0", then it indicates a second mode of the encoder circuitry 206 in which only the VLC coding scheme is used to encode all the sub-blocks in the 16×1 image block. The decoder circuitry 208 may be configured to read the enable bit to determine the mode of the encoder circuitry 206 and determine a decoding scheme to be applied to decode the encoded 16×1 image block based on the enable bit.

The encoder circuitry 206 may be configured to apply the VLC coding scheme on each of the $QRB_1$, $QRB_3$, $QRB_4$, and $QRB_8$ to generate a first set of code words of lengths $B1_0, B1_1, B1_2, \ldots B1_7$. And, the encoder circuitry 206 may be configured to apply the PCM coding scheme on each of the $QB_2$, $QB_5$, $QB_6$, and $QB_7$ to generate a second set of code words, each code word having the same length B2 as PCM is a fixed length coding scheme.

The encoder circuitry 206 may be configured to generate a bit-stream of encoded 16×1 image block that includes the first set and the second set of code words in a sequential order of the sub-blocks. The generated bit-stream may also include the signaling bits ($S_B$) and the enable bit (EN). In a scenario, when the enable bit is "0", the generated bit-stream may not include the signaling bits ($S_B$). Thus, the total number of bits ($N_B$) may be computed by equation (2), for example, as given below.

$$N_B = \sum_{i=0}^{7} B1_{(i)} + B2 \sum_{j=1}^{4} j + S_B + EN \quad (2)$$

Figure 6A:
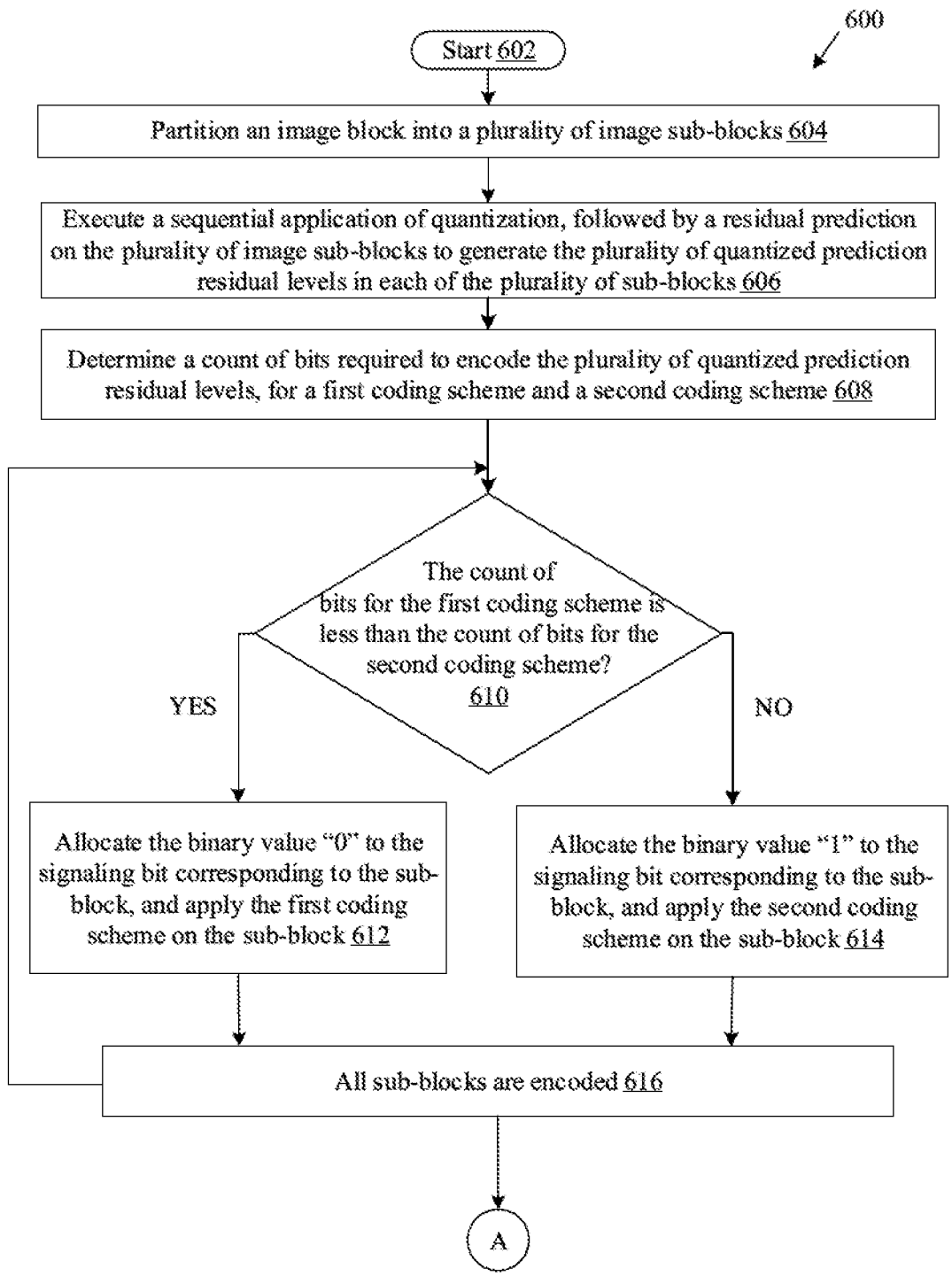
FIGS. 6A and 6B, collectively, depicts a flowchart that illustrates an exemplary method for sub-block based coding of quantized prediction residual levels, in accordance with an embodiment of the disclosure.
Figure 6B:
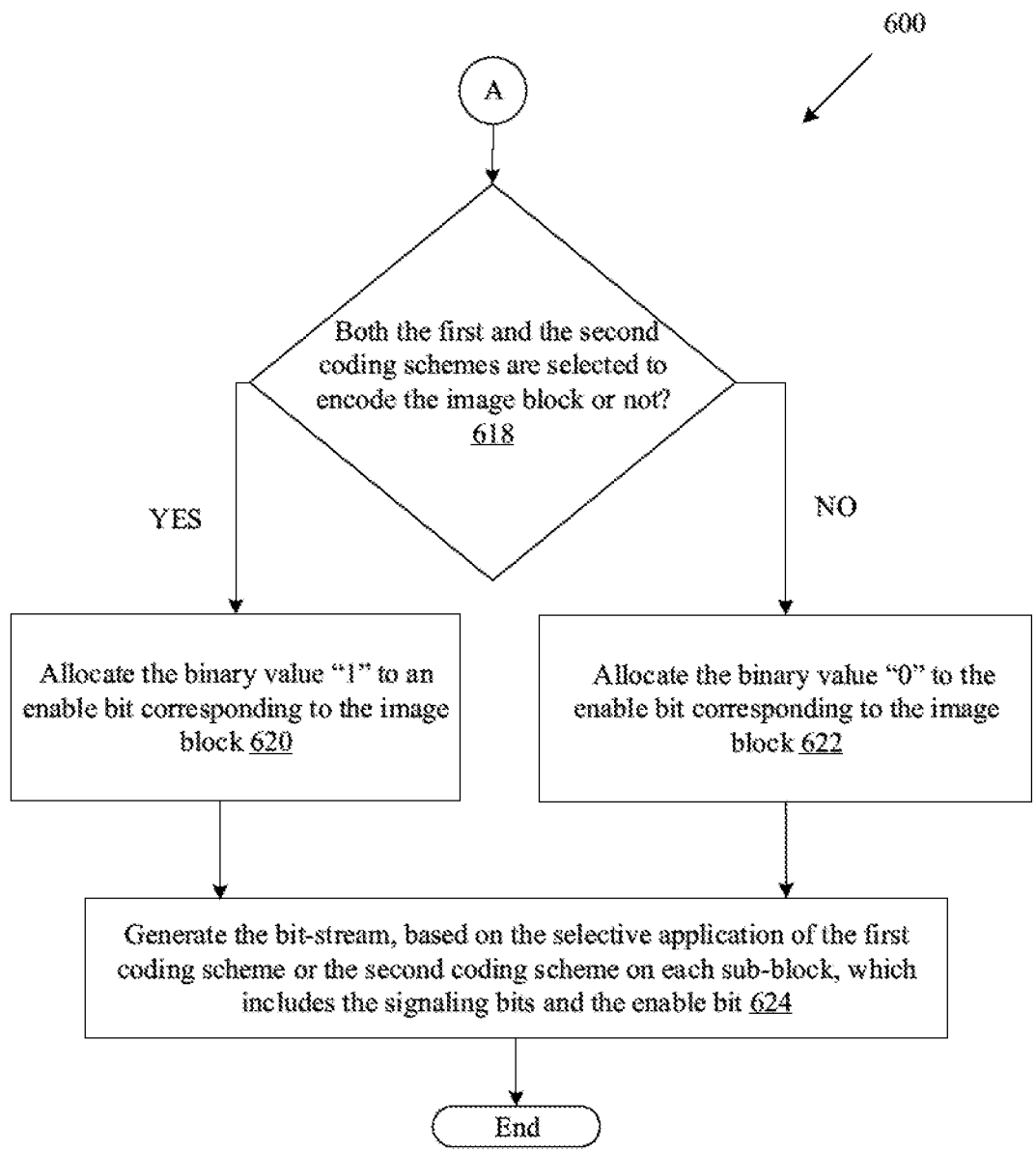

FIGS. 6A and 6B, collectively, depicts a flow chart that illustrates an exemplary method for sub-block based coding of quantized prediction residual levels, in accordance with an embodiment of the disclosure. FIGS. 6A and 6B are explained in conjunction with elements from FIGS. 1, 2, 3, 4A, 4B, and 5. With reference to FIGS. 6A and 6B, there is shown a flowchart 600 implemented in the EBC circuitry 108. The method starts at 602 and proceeds to 604.

At 604, an image block may be partitioned into a plurality of image sub-blocks. In accordance with an embodiment, the image block may be a 1D image block. In accordance with another embodiment, the image block may be a 2D image block. The encoder circuitry 206 may be configured to partition the image block, for example, a "16×1" image block, into a plurality of image sub-blocks. Then, the method proceeds to 606.

At 606, a sequential application of quantization may be executed, followed by a residual prediction on the plurality of image sub-blocks to generate a plurality of quantized prediction residual levels in each of the plurality of sub-blocks. The encoder circuitry 206 may be configured to execute a sequential application of quantization, followed by a residual prediction on the plurality of image sub-blocks to generate the plurality of quantized prediction residual levels in each of the plurality of sub-blocks. Then, the method proceeds to 608.

At 608, a count of bits required to encode the plurality of quantized prediction residual levels, for a first coding scheme and a second coding scheme may be determined. The encoder circuitry 206 may be configured to determine the count of bits required to encode the plurality of quantized prediction residual levels, for the first coding scheme and the second coding scheme. Then, the method proceeds to 610.

At 610, it may be determined whether the count of bits for the first coding scheme is less than the count of bits for the second coding scheme. The encoder circuitry 206 may be configured to determine whether the count of bits for the first coding scheme is less than the count of bits for the second coding scheme. In cases the count of bits for the first coding scheme is less than the count of bits for the second coding scheme, then the control passes to 612, or else to 614.

At 612, a binary value "0" may be allocated to a signaling bit corresponding to the sub-block, based on the determination that the majority of the plurality of quantized prediction residual levels in that sub-block lie within the threshold range, and a first coding scheme is applied on the sub-block. The encoder circuitry 206 may be configured to allocate the binary value "0" to the signaling bit corresponding to the sub-block, based on the determination that the majority of the plurality of quantized prediction residual levels in that sub-block lie within the threshold range, and apply the first coding scheme on the sub-block. Then, the method proceeds to 616.

At 614, a binary value "1" may be allocated to a signaling bit corresponding to the sub-block, based on the determination that the majority of the plurality of quantized prediction residual levels in that sub-block lie outside the threshold range, and a second coding scheme is applied on the sub-block. The encoder circuitry 206 may be configured to allocate the binary value "1" to the signaling bit corresponding to the sub-block, based on the determination that the majority of the plurality of quantized prediction residual levels in that sub-block lie outside the threshold range, and apply the second coding scheme on the sub-block. Then, the method proceeds to 616.

At 616, it may be checked that all sub-blocks of the plurality of sub-blocks are processed or not. In cases where any sub-block is still remaining to be encoded, then the control returns to 610, or else the control passes to 618.

At 618, it may be determined whether both the first and the second coding schemes are selected to encode the image block or not. The encoder circuitry 206 may be configured to determine whether both the first and the second coding schemes are selected to encode the image block or not. In cases where both the first and the second coding schemes are selected to encode the image block, then the control passes to 620, or else to 622.

At 620, a binary value "1" may be allocated to an enable bit for the image block, based on the determination that both the first and the second coding schemes are selected to encode the image block. The encoder circuitry 206 may be configured to allocate the binary value "1" to the enable bit corresponding to the image block, based on the determination that both the first and the second coding schemes are selected to encode the image block. Then, the method proceeds to 624.

At 622, a binary value "0" may be allocated to the enable bit for the image block, based on the determination that both the first and the second coding schemes are not selected to encode the image block. In other words, only a single coding scheme is selected. The encoder circuitry 206 may be configured to allocate the binary value "0" to the enable bit corresponding to the image block, based on the determination that both the first and the second coding schemes are not selected to encode the image block. Then, the method proceeds to 624.

At 624, a bit-stream may be generated based on the selective application of the first coding scheme or the second coding scheme on each sub-block. The generated bit-stream also includes the signaling bits corresponding to the plurality of sub-blocks and the enable bit corresponding to the image block. The encoder circuitry 206 may be configured to generate the bit-stream based on the selective application of the first coding scheme or the second coding scheme on each sub-block. And the method proceeds to end.

Certain embodiments of the disclosure may be found in an embedded codec (EBC) circuitry. Various embodiments of the disclosure may provide the EBC circuitry that may include an encoder circuitry. The encoder circuitry may be configured to determine a count of bits required to encode a plurality of quantized prediction residual levels in each sub-block of a plurality of sub-blocks of an image block, for a first coding scheme and a second coding scheme. The encoder circuitry may be further configured to allocate either a first bit value or a second bit value to a signaling bit for each sub-block of the plurality of sub-blocks, based on the based on the determined count of bits for the first coding scheme and the second coding scheme. The first bit value indicates the first coding scheme and is allocated for a first set of sub-blocks from the plurality of sub-blocks based on a first determination that the count of bits for the first coding scheme is less than the count of bits for the second coding scheme. The second bit value indicates the second coding scheme and is allocated for a second set of sub-blocks of the plurality of sub-blocks based on a second determination that the count of bits for the second coding scheme is less than the count of bits for the first coding scheme. The encoder circuitry may be further configured to generate a bit-stream of the image block by selective application of either the first coding scheme or the second coding scheme on each sub-block of the plurality of sub-blocks, based on either the first bit value or the second bit value allocated to the signaling bit for each sub-block of the plurality of sub-blocks.

In accordance with an embodiment, the encoder circuitry may be further configured to execute quantization on input pixel values in each sub-block of the plurality of sub-blocks to generate a plurality of quantized values in each sub-block of the plurality of sub-blocks. The plurality of quantized values are stored in an external or an on-chip memory. The encoder circuitry may be further configured to execute a residual prediction on the plurality of quantized values in each sub-block of the plurality of sub-blocks to generate the plurality of quantized prediction residual levels in each sub-block of the plurality of sub-blocks. The encoder circuitry may be further configured to apply the first coding scheme on the plurality of quantized prediction residual levels that correspond to the first set of sub-blocks, based on the allocated first bit value of the signaling bit. The encoder circuitry may be further configured to apply the second coding scheme on the stored plurality of quantized values that correspond to the second set of sub-blocks, based on the allocated second bit value of the signaling bit.

In accordance with an embodiment, the first bit value may include a binary value "0" and the second bit value may include a binary value "1".

In accordance with an embodiment, the first coding scheme may include a variable length coding (VLC) scheme and the second coding scheme may include a fixed length coding (FLC) scheme.

In accordance with an embodiment, both the first coding scheme and the second coding scheme are variable length coding schemes.

In accordance with an embodiment, the first coding scheme may include an entropy coding scheme and the second coding scheme may include a pulse code modulation (PCM) coding scheme. The entropy coding scheme may include, but is not limited to, a Huffman coding scheme, an exponential Golomb coding scheme, a progressive Golomb coding scheme, a Golomb-Rice coding scheme, and a combination of the Huffman coding scheme and the exponential Golomb coding scheme.

In accordance with an embodiment, the encoder circuitry may be further configured to execute either a first sequential encoding scheme or a second sequential encoding scheme on the image block to generate the bit-stream of the image block. The bit-stream of encoded image block may include header information that indicates the sequential encoding scheme applied to encode the image block to obtain the bit-stream of the image block. The first sequential encoding scheme may include a sequential application of quantization, followed by residual prediction, and one of the first coding scheme or the second coding scheme on each sub-block of plurality of sub-blocks. The second sequential encoding scheme may include a sequential application of the residual prediction, followed by transform coding, quantization, and one of the first coding scheme or the second coding scheme on each sub-block of plurality of sub-blocks.

In accordance with an embodiment, the encoder circuitry may be further configured to determine whether the first coding scheme is selected for each sub-block of the plurality of sub-blocks, based on the allocated bit value to the signaling bit. The encoder circuitry may be further configured to allocate the first bit value to the enable bit for the image block, based on the determination the first coding scheme is selected for each sub-block of the plurality of sub-blocks. The first bit value of the enable bit indicates a first mode in which a number of bits in the generated bit-stream may include the enable bit and not the signaling bits. The encoder circuitry may be further configured to allocate the second bit value to the second signaling bit for the image block, based on the determination both the first coding scheme and the second coding scheme are selected for the plurality of sub-blocks. The second bit value of the enable bit indicates a second mode in which a number of bits in the generated bit-stream may include the signaling bits and the enable bit.

In accordance with an embodiment, the image block corresponds to a chroma block having a color model. The color model may include, but is not limited to, a RGB model and a YUV model. The RGB model may include a plurality of color-blocks that correspond to "R" component, "G" component, and "B" component. The encoder circuitry may be further configured to allocate either the first bit value or the second bit value to the signaling bit for any one of the plurality of color-blocks. The encoder circuitry may be further configured to allocate either the first bit value or the second bit value to the signaling bit for each color block of the plurality of color-blocks.

In accordance with an embodiment, the encoder circuitry may be configured to determine whether all of the plurality of quantized prediction residual levels in the first set of sub-blocks have zero values or not. The encoder circuitry may be further configured to set an all-zero (AZ) signaling bit to a binary value "1" based on the determination that all of the plurality of quantized prediction residual levels in the first set of sub-blocks have zero values. The third signaling bit is included in header information of the generated bit-stream. The encoder circuitry may be further configured to skip the application of the first coding scheme based on the AZ signaling bit.

In accordance with an embodiment, the encoder circuitry may be configured to determine a maximum number of quantized prediction residual levels, from a total number of the plurality of quantized prediction residual levels in each sub-block of the plurality of sub-blocks of the image block, lie within a threshold range. The threshold range may indicate a range of values, of the plurality of quantized prediction residual levels, and may include a zero value. An output of the first coding scheme is a first code word, and an output of the second coding scheme is a second code word. The first code word has a length (number of bits) that is less than a length of the second code word, within the threshold range. The length of the second code word is less than the length of the first code word outside the threshold range.

In accordance with an embodiment, the image block may be a one-dimensional (1D) image block.

In accordance with an embodiment, the image block may be a two-dimensional (2D) image block.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An embedded codec (EEC) circuitry, comprising: encoder circuitry configured to:
determine, for a first coding scheme and a second coding scheme, a count of bits required to encode a plurality of quantized prediction residual levels in each sub-block of a plurality of sub-blocks of an image block;
determine a maximum number of quantized prediction residual levels from a total number of the plurality of quantized prediction residual levels in each sub block of the plurality of sub-blocks of the image block within a threshold range, wherein the threshold range indicates a range of values of the plurality of quantized prediction residual levels; and
allocate one of a first bit value or a second bit value to a first signaling bit for each sub-block of the plurality of sub-blocks based on one of the determined count of bits for the first coding scheme and the second coding scheme, or the determined maximum number of quantized prediction residual levels in each sub-block of the plurality of sub-blocks within the threshold range, wherein
the first bit value indicates the first coding scheme,
the first bit value is allocated for a first set of sub-blocks from the plurality of sub-blocks based on a first determination that the count of bits for the first coding scheme is less than the count of bits for the second coding scheme,
the second bit value indicates the second coding scheme, and
the second bit value is allocated for a second set of sub-blocks of the plurality of sub-blocks based on a second determination that the count of bits for the second coding scheme is less than the count of bits for the first coding scheme; and generate a bit-stream of the image block by selective application of one of the first coding scheme or the second coding scheme on each sub-block of the plurality of sub-blocks, based on one of the first bit value or the second bit value allocated to the first signaling bit for each sub-block of the plurality of sub-blocks.

2. The EBC circuitry according to claim 1, wherein the encoder circuitry is further configured to:
quantize input pixel values of each sub-block of the plurality of sub-blocks to generate a plurality of quantized values in each sub-block of the plurality of sub-blocks;
store the plurality of quantized values in a memory; and
execute a residual prediction on the plurality of quantized values in each sub-block of the plurality of sub-blocks to generate the plurality of quantized prediction residual levels in each sub-block of the plurality of sub-blocks.

3. The EBC circuitry according to claim 2, wherein the encoder circuitry is further configured to:
apply the first coding scheme on the plurality of quantized prediction residual levels that correspond to the first set of sub-blocks, based on the allocated first bit value of the first signaling bit; and
apply the second coding scheme on the stored plurality of quantized values that correspond to the second set of sub-blocks, based on the allocated second bit value of the first signaling bit.

4. The EBC circuitry according to claim 1, wherein the first bit value is a binary '0' value, and the second bit value is a binary '1' value.

5. The EBC circuitry according to claim 1, wherein the first coding scheme is a variable length coding (VLC), and
the second coding scheme is a fixed length coding (FLC).

6. The EBC circuitry according to claim 1, wherein:
the first coding scheme is a first variable length coding (VLC1), and
the second coding scheme is a second variable length coding (VLC2).

7. The EBC circuitry according to claim 1, wherein the first coding scheme is an entropy coding scheme, and the second coding scheme is a pulse code modulation (PCM) coding scheme.

8. The EBC circuitry according to claim 1, wherein the encoder circuitry is further configured to execute one of a first sequential encoding scheme or a second sequential encoding scheme on the image block to generate the bit-stream of the image block,
the generated bit-stream of the image block comprises header information, and
the header information indicates one of the first sequential encoding scheme or the second sequential encoding scheme.

9. The EBC circuitry according to claim 8, wherein the first sequential encoding scheme comprises a sequential application of quantization, followed by residual prediction, and one of the first coding scheme or the second coding scheme on each sub-block of the plurality of sub-blocks, and
the second sequential encoding scheme comprises a sequential application of the residual prediction, followed by transform coding, the quantization, and one of the first coding scheme or the second coding scheme on each sub-block of the plurality of sub-blocks.

10. The EBC circuitry according to claim 1, wherein the encoder circuitry is further configured to:
determine the first coding scheme for each sub-block of the plurality of sub-blocks;
allocate the first bit value to a second signaling bit for the image block, based on the determination that the first coding scheme is selected for each sub-block of the plurality of sub-blocks, wherein the second signaling bit is different from the first signaling bit; and
allocate the second bit value to the second signaling bit for the image block, based on the determination that at least one of the first coding scheme or the second coding scheme is selected for the plurality of sub-blocks.

11. The EBC circuitry according to claim 10, wherein
the first bit value of the second signaling bit indicates a first mode and the second bit value of the second signaling bit indicates a second mode,
in the first mode, a number of bits in the generated bit-stream comprises the second signaling bit, and
in the second mode, a number of bits in the generated bit-stream comprises a plurality of first signaling bits that includes the first signaling bit allocated to each sub-block of the plurality of sub-blocks, and the second signaling bit.

12. The EBC circuitry according to claim 1, wherein
the image block corresponds to a chroma block having a defined color model, wherein the defined color model comprises a plurality of components, and
the encoder circuitry is further configured to allocate one of the first bit value or the second bit value to the first signaling bit for at least one component of the plurality of components.

13. The EBC circuitry according to claim 1, wherein the encoder circuitry is further configured to:
determine the plurality of quantized prediction residual levels in the first set of sub-blocks have zero values;
set a third signaling bit to a binary '1' value based on the determination that all of the plurality of quantized prediction residual levels in the first set of sub-blocks have zero values, wherein the third signaling bit is included in header information of the generated bit-stream; and
skip the application of the first coding scheme based on the set third signaling bit.

14. The EBC circuitry according to claim 1, wherein the threshold range includes a zero value.

15. The EBC circuitry according to claim 1, wherein,
an output of the first coding scheme is a first code word,
an output of the second coding scheme is a second code word,
in the threshold range, a length of the first code word is less than a length of the second code word, and
outside the threshold range, the length of the second code word is less than the length of the first code word.

16. The EBC circuitry according to claim 1, wherein the image block is a one-dimensional (1D) image block.

17. The EBC circuitry according to claim 1, wherein the image block is a two-dimensional (2D) image block.

18. A method, comprising:
in an embedded codec (EBC) circuitry:
determining, for a first coding scheme and a second coding scheme, a count of bits required to encode a plurality of quantized prediction residual levels in each subblock of a plurality of sub-blocks of an image block;

determining a maximum number of quantized prediction residual levels from a total number of the plurality of quantized prediction residual levels in each sub-block of the plurality of sub-blocks of the image block within a threshold range, wherein the threshold range indicates a range of values of the plurality of quantized prediction residual levels; and allocating one of a first bit value or a second bit value to a first signaling bit for each sub-block of the plurality of sub-blocks based on one of the determined count of bits for the first coding scheme and the second coding scheme, or the determined maximum number of quantized prediction residual levels in each sub-block of the plurality of sub-blocks within the threshold range, wherein the first bit value indicates the first coding scheme, the first bit value is allocated for a first set of sub-blocks from the plurality of sub-blocks based on a first determination that the count of bits for the first coding scheme is less than the count of bits for the second coding scheme, wherein the second bit value indicates the second coding scheme, and the second bit value is allocated for a second set of sub-blocks of the plurality of sub-blocks based on a second determination that the count of bits for the second coding scheme is less than the count of bits for the first coding scheme; and generating a bit-stream of the image block by selective application of one of the first coding scheme or the second coding scheme on each sub-block of the plurality of sub-blocks, based on one of the first bit value or the second bit value allocated to the first signaling bit for each sub-block of the plurality of sub-blocks.

19. The method according to claim 18 further comprising:

quantizing input pixel values of each sub-block of the plurality of sub-blocks to generate a plurality of quantized values in each sub-block of the plurality of sub-blocks;

storing the plurality of quantized values in a memory; and executing a residual prediction on the plurality of quantized values in each sub-block of the plurality of sub-blocks to generate the plurality of quantized prediction residual levels in each sub-block of the plurality of sub-blocks.

20. The method according to claim 19, further comprising:

applying the first coding scheme on the plurality of quantized prediction residual levels that correspond to the first set of sub-blocks, based on the allocated first bit value of the first signaling bit; and applying the second coding scheme on the stored plurality of quantized values that correspond to the second set of sub-blocks, based on the allocated second bit value of the first signaling bit.

* * * * *